(12) United States Patent
Osawa et al.

(10) Patent No.: US 10,814,408 B2
(45) Date of Patent: Oct. 27, 2020

(54) REPLACEABLE-TIP CUTTING TOOL MAIN BODY AND REPLACEABLE-TIP CUTTING TOOL

(71) Applicant: OSG CORPORATION, Toyokawa-shi, Aichi (JP)

(72) Inventors: Jiro Osawa, Toyokawa (JP); Tamotsu Nagai, Toyokawa (JP)

(73) Assignee: OSG CORPORATION, Toyokawa-shi, Aichi (JP)

( * ) Notice: Subject to any disclaimer, the term of this patent is extended or adjusted under 35 U.S.C. 154(b) by 114 days.

(21) Appl. No.: 16/096,383

(22) PCT Filed: Nov. 1, 2016

(86) PCT No.: PCT/JP2016/082494
§ 371 (c)(1),
(2) Date: Oct. 25, 2018

(87) PCT Pub. No.: WO2018/083743
PCT Pub. Date: May 11, 2018

(65) Prior Publication Data
US 2019/0126365 A1 May 2, 2019

(51) Int. Cl.
*B23C 5/10* (2006.01)
(52) U.S. Cl.
CPC ........ *B23C 5/10* (2013.01); *B23B 2231/0204* (2013.01); *B23B 2251/02* (2013.01);
(Continued)
(58) Field of Classification Search
CPC ............ B23C 2210/02; B23C 2210/03; B23C 2240/32; B23B 2251/02;
(Continued)

(56) References Cited

U.S. PATENT DOCUMENTS 3,924,508 A 12/1975 DeCaro
4,099,889 A * 7/1978 Vig .......................... B23B 31/00
279/8
(Continued)

FOREIGN PATENT DOCUMENTS

CN 1693723 A 11/2005
CN 101912941 A 12/2010
(Continued)

OTHER PUBLICATIONS

English translation of International Search Report of International Application No. PCT/JP2016/082494.

*Primary Examiner* — Ryan C Rufo
(74) *Attorney, Agent, or Firm* — Muncy, Geissler, Olds & Lowe, P.C.

(57) ABSTRACT

A main body (3) of a replaceable-tip cutting tool (1) includes a cylinder-shaped cylindrical portion (32) made from a first metal material and extending in an axial direction, and with a female thread portion (33) provided on an inner circumference (40) of the cylindrical portion (32) and capable of being screwed together with a male threaded portion (24) of a cutting head (2). The female thread portion (33) includes a first female thread portion (34) and a second female thread portion (35). The first female thread portion (34) is a portion between a top of a female thread crest (37) of the female thread portion (33) and a portion of the female thread portion (35) that is on the female thread crest (37) side of a female thread root (36) and on the female thread root side of a portion corresponding to an effective diameter of the female thread portion (33). The first female thread portion (34) is made from a second metal material that is different from the first metal material. The second female thread portion (35) is continuous with the inner circumference (40) of the cylindrical portion (32). The second female thread portion is a remaining portion of the female thread portion excluding (Continued)

the first female thread portion. The second female thread portion (35) is made from the first metal material.

4 Claims, 5 Drawing Sheets

(52) U.S. Cl.
CPC ...... *B23C 2210/02* (2013.01); *B23C 2210/03* (2013.01); *B23C 2240/32* (2013.01)

(58) Field of Classification Search
CPC ...... B23B 2260/1388; B23B 2260/138; B23B 2260/1386; B23B 2231/0204; B23B 27/18; B23G 2200/02; B23G 2200/06; B23D 2277/02; B23D 2277/06
See application file for complete search history.

(56) References Cited

U.S. PATENT DOCUMENTS

| | | | |
|---|---|---|---|
| 4,257,307 A | 3/1981 | Regensburger | |
| 6,244,780 B1 * | 6/2001 | Hansson | B23B 29/046 279/67 |
| 2002/0168239 A1 * | 11/2002 | Mast | B23B 51/02 408/144 |
| 2005/0244249 A1 | 11/2005 | Sussenbach | |
| 2007/0189870 A1 | 8/2007 | Kaiser et al. | |
| 2008/0213065 A1 | 9/2008 | Sussenbach | |
| 2009/0317209 A1 * | 12/2009 | Grubert | F16B 37/125 411/387.4 |
| 2012/0093602 A1 | 4/2012 | Osawa et al. | |
| 2013/0004250 A1 | 1/2013 | Gamble | |
| 2013/0022415 A1 | 1/2013 | Osawa et al. | |
| 2014/0056658 A1 * | 2/2014 | Maeda | B23B 31/1115 407/40 |
| 2014/0234035 A1 | 8/2014 | Azegami et al. | |
| 2014/0360334 A1 | 12/2014 | Singer-Schnoeller | |
| 2015/0360295 A1 | 12/2015 | Haimer | |

FOREIGN PATENT DOCUMENTS

| | | | |
|---|---|---|---|
| CN | 102458742 A | 5/2012 | |
| CN | 102848002 A | 1/2013 | |
| CN | 104220197 A | 12/2014 | |
| CN | 204818293 U | 12/2015 | |
| CN | 204843092 U | 12/2015 | |
| DE | 10255270 A1 * | 6/2004 | ............... B23C 5/10 |
| EP | 1818125 A1 | 8/2007 | |
| JP | 52050906 A * | 4/1977 | ........... B23B 27/148 |
| JP | 2002103130 A | 4/2002 | |
| JP | 2004-338079 A | 12/2004 | |
| JP | 2007-216378 A | 8/2007 | |
| JP | 4993528 B2 | 8/2012 | |
| JP | 2016-505398 A | 2/2016 | |
| WO | 2011/108108 A1 | 9/2011 | |
| WO | 2013/057778 A1 | 4/2013 | |
| WO | 2014/118264 A1 | 8/2014 | |

* cited by examiner

REPLACEABLE-TIP CUTTING TOOL MAIN BODY AND REPLACEABLE-TIP CUTTING TOOL

TECHNICAL FIELD

The present invention relates to a replaceable-tip cutting tool main body and to a replaceable-tip cutting tool.

BACKGROUND ART

A replaceable-tip cutting tool in which a cutting head can be mounted on and removed from a main body is one known type of cutting tool that performs cutting work on a work material by being driven rotationally by a machining center or the like. If the cutting edge of the replaceable-tip cutting tool is damaged, it is possible to replace only the cutting head and to reuse the main body. In a case where both the main body and the cutting head are made from a cemented carbide, the replaceable-tip cutting tool is susceptible to damage from the shock of vibration in the thread of a male threaded portion or a female threaded portion, the male threaded portion and the female threaded portion join the main body and the cutting head. To counter this problem, in a cutting tool that is disclosed in Patent Literature 1, a helisert that has lower rigidity than the cemented carbide is installed in the female threaded portion of the main body, such that the main body and the cutting head are affixed to one another by screwing the male threaded portion of the cutting head into the helisert.

CITATION LIST

Patent Literature

[Patent Literature 1]
Japanese Patent No. 4993528

SUMMARY OF INVENTION

With the known cutting tool that is described above, in a case where the diameter of the male threaded portion that is formed at the end of the cutting head and the size of the main body are both fixed, the diameter of the female threaded portion must be greater than that of the male threaded portion by the amount that is necessary in order to allow the helisert to be installed. The radial direction thickness of the main body, which is formed from the cemented carbide, must therefore be reduced, which diminishes the rigidity of the main body.

An object of the present invention is to provide a replaceable-tip cutting tool main body and a replaceable-tip cutting tool that, in a case where a cutting head can be mounted on and removed from the main body, are able to inhibit vibration during cutting work while maintaining the rigidity of the main body.

According to a first aspect of the present invention, a replaceable-tip cutting tool main body is provided, and the replaceable-tip cutting tool main body includes a cylinder-shaped cylindrical portion made from a first metal material and extending in an axial direction; and a female thread portion provided on an inner circumference of the cylindrical portion and capable of being screwed together with a male threaded portion of a cutting head. The female thread portion includes a first female thread portion and a second female thread portion. The first female thread portion is made from a second metal material that is different from the first metal material. The first female thread portion is a portion between a top of a female thread crest of the female thread portion and a portion of the female thread portion that is on the female thread crest side of a female thread root and on the female thread root side of a portion corresponding to an effective diameter of the female thread portion. The second female thread portion is made from the first metal material, continuous with the inner circumference of the cylindrical portion. The second female thread portion is a remaining portion of the female thread portion excluding the first female thread portion.

In the replaceable-tip cutting tool main body in the first aspect, the male threaded portion of the cutting head is screwed together with the female thread portion, which includes the first female thread portion and the second female thread portion. The use of a metal material with comparatively low rigidity for the first female thread portion and a metal material with comparatively high rigidity for the second female thread portion and the cylindrical portion makes it possible both to maintain the rigidity of the main body and to reduce the possibility of damage of the thread crests of the male threaded portion or the female thread portion due to the shock of vibration, the male threaded portion and the female thread portion join the main body and the cutting head.

In the first aspect of the replaceable-tip cutting tool main body, the first metal material may be an alloy with a density of not less than 10 grams per cubic centimeter, and the second metal material may be a type of steel. In this aspect of the replaceable-tip cutting tool main body, the rigidity of the cylindrical portion can be ensured by making the cylindrical portion from the first metal material, which has the density of not less than 10 grams per cubic centimeter. Furthermore, making the first female thread portion from a type of steel makes it possible to reduce the possibility of damage of thread crests of the male threaded portion or the female thread portion due to the shock of vibration, the male threaded portion and the female thread portion join the main body and the cutting head.

In the first aspect of the replaceable-tip cutting tool main body, a thickness of the cylindrical portion in a radial direction may be greater than a thickness of the female thread portion in the radial direction. In this aspect of the replaceable-tip cutting tool main body, the rigidity of the cylindrical portion can be ensured, because the thickness of the cylindrical portion in the radial direction is greater than the thickness of the female thread portion in the radial direction.

In the first aspect, the replaceable-tip cutting tool main body may further include a cylinder-shaped front end portion on a front end of the cylindrical portion and the female thread portion. The cylinder-shaped front end portion may be made from the second metal material and may accommodate a tapered portion that is continuous with the male threaded portion of the cutting head. The tapered portion has a smaller diameter on the male threaded portion side. In this aspect of the replaceable-tip cutting tool main body, the tapered portion, which is continuous with the male threaded portion of the cutting head, can be accommodated by the front end portion, which is made of the second metal material. Therefore, the replaceable-tip cutting tool main body is better able to reduce the possibility of damage of the thread crests of the male threaded portion or the female thread portion due to the shock of vibration, the male threaded portion and the female thread portion join the main body and the cutting head, than would be the case if the front end portion were not provided.

According to a second aspect of the present invention, a replaceable-tip cutting tool is provided, and the replaceable-tip cutting tool includes the replaceable-tip cutting tool main body according to the first aspect, and a cutting head having a male threaded portion that, when screwed together with the female thread portion of the main body, comes into contact with both the first female thread portion and the second female thread portion.

In the replaceable-tip cutting tool in the second aspect, the male threaded portion of the cutting head is screwed together with the female thread portion, which includes the first female thread portion and the second female thread portion. The use of a metal material with comparatively low rigidity for the first female thread portion and a metal material with comparatively high rigidity for the second female thread portion and the cylindrical portion makes it possible both to maintain the rigidity of the main body and to reduce the possibility of damage of the thread crests of the male threaded portion or the female thread portion due to the shock of vibration, the male threaded portion and the female thread portion join the main body and the cutting head. In the replaceable-tip cutting tool, the male threaded portion of the cutting head comes into contact with both the first female thread portion and the second female thread portion. Therefore, in the replaceable-tip cutting tool, the second female thread portion makes it possible for the cutting head to be fastened tightly to the main body, even as the first female thread portion makes it possible to reduce the shock of vibration of the thread crests of the male threaded portion or the female thread portion, the male threaded portion and the female thread portion join the main body and the cutting head.

DESCRIPTION OF EMBODIMENTS

Hereinafter, a preferred embodiment of the present invention will be explained with reference to the attached drawings. The structural configuration of a replaceable-tip cutting tool (hereinafter called the cutting tool) 1 of the present invention will be explained with reference to FIG. 1. In the explanation that follows, AX indicates a longitudinal axis line of the cutting tool 1, and in the axial direction of the axis line AX, the front end of the cutting tool 1, in relation to a main body 3, is the end where a cutting portion 21 of a cutting head 2 is provided, and the rear end is the opposite end of the cutting tool 1 from the front end. On a plane that is orthogonal to the axis line AX, the direction away from the axis line AX will be called the radial direction.

1. Physical Configuration of the Cutting Tool 1

Figure 1:
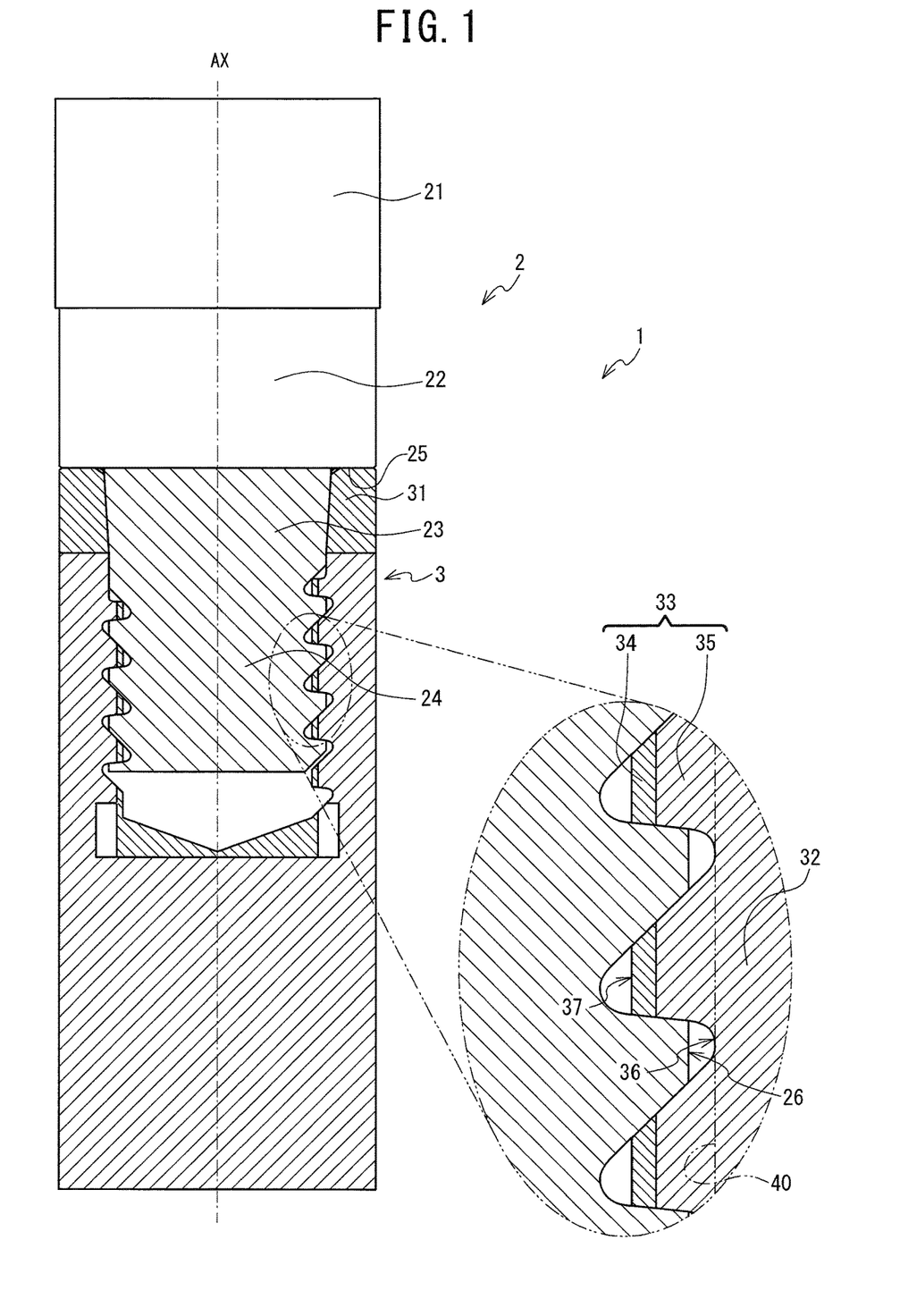
FIG. 1 is a partial section view of a cutting tool 1 that is provided with a cutting head 2 and a main body 3.

As shown in FIG. 1, the cutting tool 1 is a cutting tool that, by being rotationally driven by a machining center or the like, performs cutting work on a work material. More specifically, the cutting tool 1 is a replaceable-tip cutting tool that is provided with the cutting head 2 and the main body 3, with the cutting head 2 being mountable on and removable from the main body 3. The cutting head 2 is made from a cemented carbide formed by pressure sintering of tungsten carbide or the like. The cutting head 2 is provided with the cutting portion 21, a body portion 22, a tapered portion 23, and a male threaded portion 24 in that order from the front end toward the rear end in the axial direction. The cutting portion 21 is a portion for performing the cutting work on the work material, and the cutting portion 21 includes a peripheral cutting edge, an end cutting edge, a chip pocket, an end gash, and the like, all of which are known. The body portion 22 and the tapered portion 23 are disposed between the cutting portion 21 and the male threaded portion 24. The diameter of the body portion 22 is greater than the diameter of tapered portion 23. Among the surfaces of the body portion 22, a surface 25 where the body portion 22 is joined to the tapered portion 23 is substantially orthogonal to the axial direction. The tapered portion 23 is tapered such that the tapered portion has a smaller diameter on the male threaded portion 24 side. The male threaded portion 24 is joined to the rear end of the tapered portion 23, and the male threaded portion 24 is threaded with male threads around the outer circumference of the male threaded portion 24.

Figure 2:
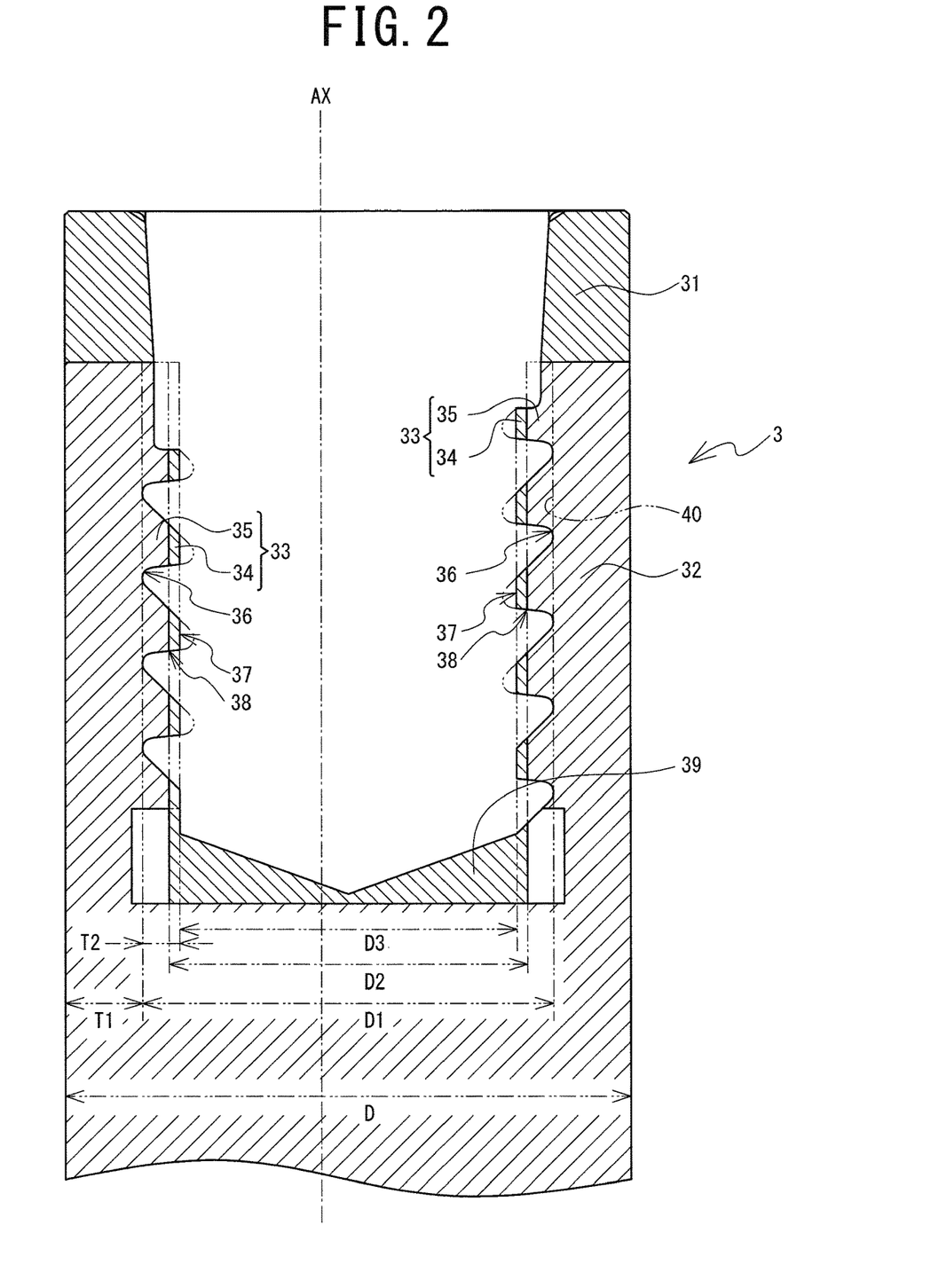
FIG. 2 is an enlarged view of female thread portions 33 in the section view in FIG. 1.

As shown in FIG. 2, the main body 3 is the main body of the replaceable-tip cutting tool, extending in the axial direction, and the cutting head 2 can be mounted in and removed from the main body 3. The main body 3 is provided with a front end portion 31, a cylindrical portion 32, female thread portions 33, and a bottom portion 39. The front end portion 31 is provided on the front end in the axial direction of the main body 3, and the front end portion 31 comes into contact with the surface 25 of the cutting head 2 when the cutting head 2 is mounted in the main body 3. The rear edge of the front end portion 31 is joined to the front ends of the cylindrical portion 32 and the female thread portions 33. The front end portion 31 is formed from a second metal material on the front ends of the cylindrical portion 32 and the female thread portions 33, and the front end portion 31 is a cylindrical portion that accommodates the tapered portion 23, which is continuous with the male threaded portion 24 of the cutting head 2.

The cylindrical portion 32 is formed from a first metal material and is a cylindrical portion that extends in the axial direction and has a diameter D. The female thread portions 33 are provided on a virtual inner circumference 40 of the cylindrical portion 32 and are portions in which are formed female threads that can be screwed together with the male threaded portion 24 of the cutting head 2. The inside diameter of the female thread portions 33 is D3, and the root diameter of the female thread portions 33 is D1.

Each one of the female thread portions 33 is provided with a first female thread portion 34 and a second female thread portion 35. The first female thread portion 34 is the portion of the female thread portion 33 between a top of a female thread crest 37 of the female thread portion 33 and a portion that is on the female thread crest 37 side of a female thread root 36 and on the female thread root 36 side of a portion 38 corresponding to an effective diameter D2 of the female thread portion 33. The first female thread portion 34 is made from the second metal material, which is different from the first metal material. In the present embodiment, as shown in FIG. 1, in a state in which the male threaded portion 24 of the cutting head 2 is fastened to the female thread portions 33 of the main body 3, the first female thread portion 34 is the portion between the female thread crest 37 of the female thread portion 33 and a portion that is on the female thread crest 37 side of a male thread crest 26 and on the female thread root 36 side of the portion 38 corresponding to the effective diameter D2 of the female thread portion 33.

The second female thread portion 35 is a portion that is continuous with the virtual inner circumference 40 of the cylindrical portion 32 and a remaining portion of the female thread portion 33 excluding the first female thread portion 34. The virtual inner circumference 40 of the cylindrical portion 32 is defined as an inner circumference connecting the female thread roots 36 in the axial direction. The second female thread portion 35 is made from the same first metal material as the cylindrical portion 32. A thickness T1 of the cylindrical portion 32 in the radial direction is greater than a thickness T2 of the female thread portion 33 in the radial direction.

The bottom portion 39 is provided to the rear side of the female thread portions 33. The bottom portion 39 forms the bottom of a hole portion that is formed by the front end portion 31 and the female thread portions 33 of main body 3. The bottom portion 39 is formed from the same second metal material as the first female thread portions 34.

The first metal material and the second metal material are selected in consideration of the material of the cutting head 2. Specifically, it is preferable for the rigidity of the first metal material to be greater than the rigidity of the second metal material. Because the cutting head 2 in the present embodiment is formed from a cemented carbide, the first metal material in the main body 3 is formed from an alloy with a density of not less than 10 grams per cubic centimeter, for example. An alloy with a density of not less than 10 grams per cubic centimeter would be a cemented carbide or a tungsten alloy, for example. The second metal material is formed from a type of steel, for example. The type of steel may be structural steel, spring steel, bearing steel, tool steel, stainless steel, chromium-molybdenum steel, or the like.

When the cutting head 2 is mounted in the main body 3, the male threaded portion 24 of the cutting head 2 is screwed into the female thread portions 33 of the main body 3. The female thread portions 33 of the main body 3 are provided with the first female thread portions 34, which are formed from the second metal material, and the second female thread portions 35, which are formed from the first metal material. In the present embodiment, when the male threaded portion 24 of the cutting head 2 has been screwed into the female thread portions 33 of the main body 3, the male threaded portion 24 is in contact with both the first female thread portions 34 and the second female thread portions 35 of the female thread portions 33. The second metal material, which is made from steel that has less rigidity than the first metal material, is interposed between the male threaded portion 24 and the second female thread portions 35. Therefore, the impact of the vibration of the cutting head 2 on the main body 3 can be dampened. The male threaded portion 24 can be fastened tightly to the female thread portions 33. Accordingly, the vibration of the cutting head 2 during the cutting work can be inhibited more effectively. This makes it possible to inhibit damage to a cutting edge that is formed in the cutting portion 21, thereby extending the service life of the cutting head 2 and reducing the amount of the cutting heads 2 that are scrapped.

2. Manufacturing Method for the Main Body 3 of the Cutting Tool 1

Figure 3:
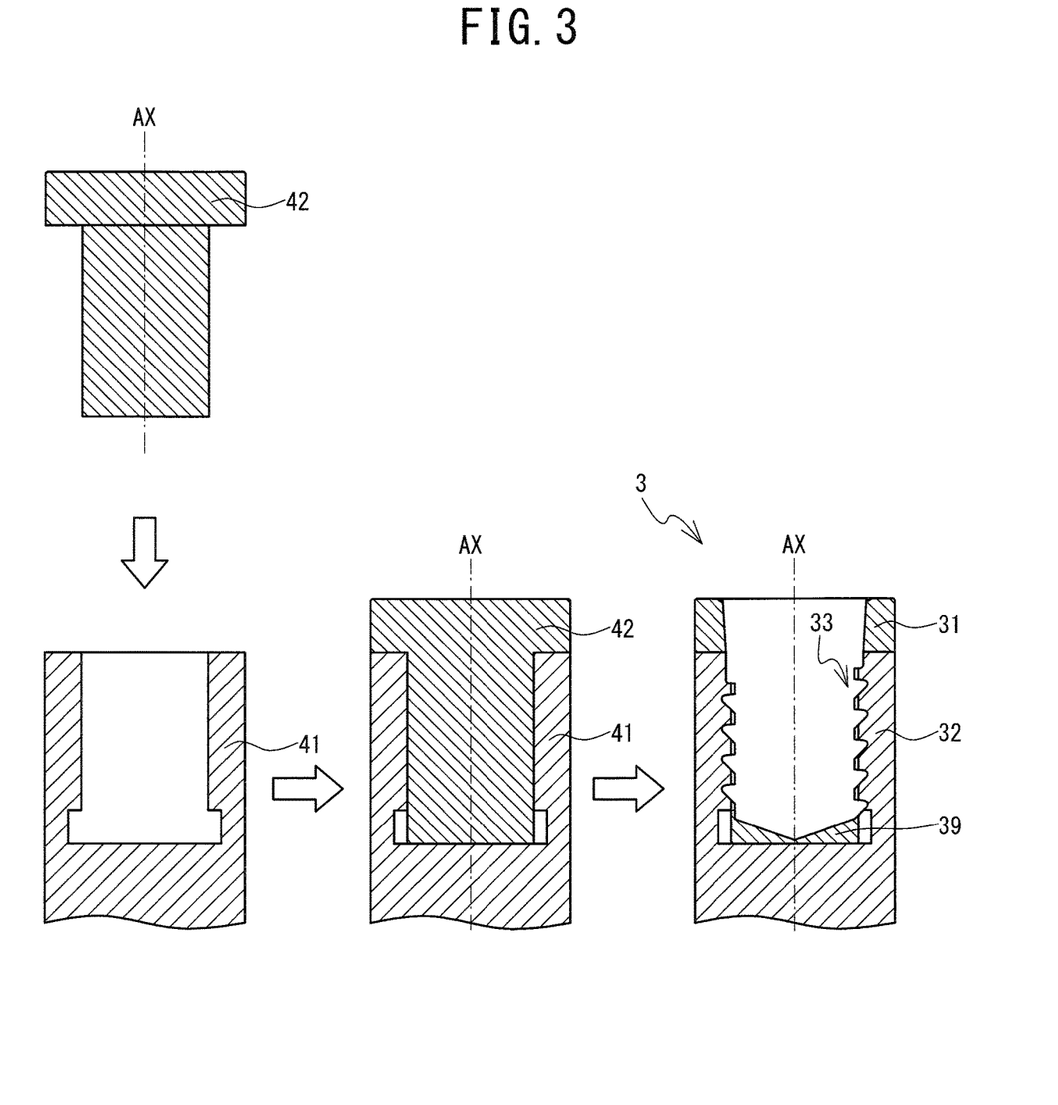
FIG. 3 is an explanatory figure for a manufacturing process for the main body 3.

The manufacturing method for the cutting tool 1 will be explained with reference to FIG. 3. As shown in FIG. 3, a member 41 that is made of the first metal material and a member 42 that is made of the second metal material are prepared, and the member 42 is fitted into the member 41 (a fitting process). The member 41 is a cylindrical member with the diameter D, and the member 41 has a recessed portion that is centered on the axis line AX extending from the front end to the rear end and that has a diameter approximately equal to the effective diameter D2 of the female thread portion 33. A front end side (the upper end side in FIG. 3) portion of the member 42 is a cylindrical portion with the diameter D, and the member 42 includes a cylindrical projecting portion with the diameter D2 on a rear end side of the member 42. The member 41 and the member 42 are combined by fitting the projecting portion of the member 42 into the recessed portion of the member 41 (a combining process). The work of cutting the female thread portions 33 is performed on the combined unit of the member 41 and the member 42 using a thread-cutting mill or the like (a fastener forming process). The main body 3 that is provided with the female thread portions 33 is thus manufactured.

3. Evaluation Testing of the Cutting Tool 1

Tests were conducted to evaluate vibration during cutting work, using the cutting tool 1 in the embodiment that is described above as a working example and a cutting tool in which the female thread portions are made only from the first metal material as a comparative example. In the working example, a cemented carbide is used for the first metal material of the main body 3, and chromium-molybdenum steel (JIS-specified SCM440) is used for the second metal material. In the comparative example, the main body is made from only a cemented carbide. The working example and the comparative example differ only in the materials used for the female thread portions of the main body, and their composition is otherwise the same.

The test conditions for the working example and the comparative example are as hereinafter described. The work material is stainless steel (JIS-specified SUS304). The processing machine is a vertical machining center. The tool diameter is 16 millimeters. The projecting length of the tool is 50 millimeters. The cutting speed is 600 meters per minute. The revolution speed is 11,950 revolutions per minute. The feed rate is 3,580 millimeters per minute. The feed rate is 0.1 millimeters per tooth (mm/t). The cut depth (grooving) is 8 millimeters. Cooling is provided by blown air.

Figure 4:
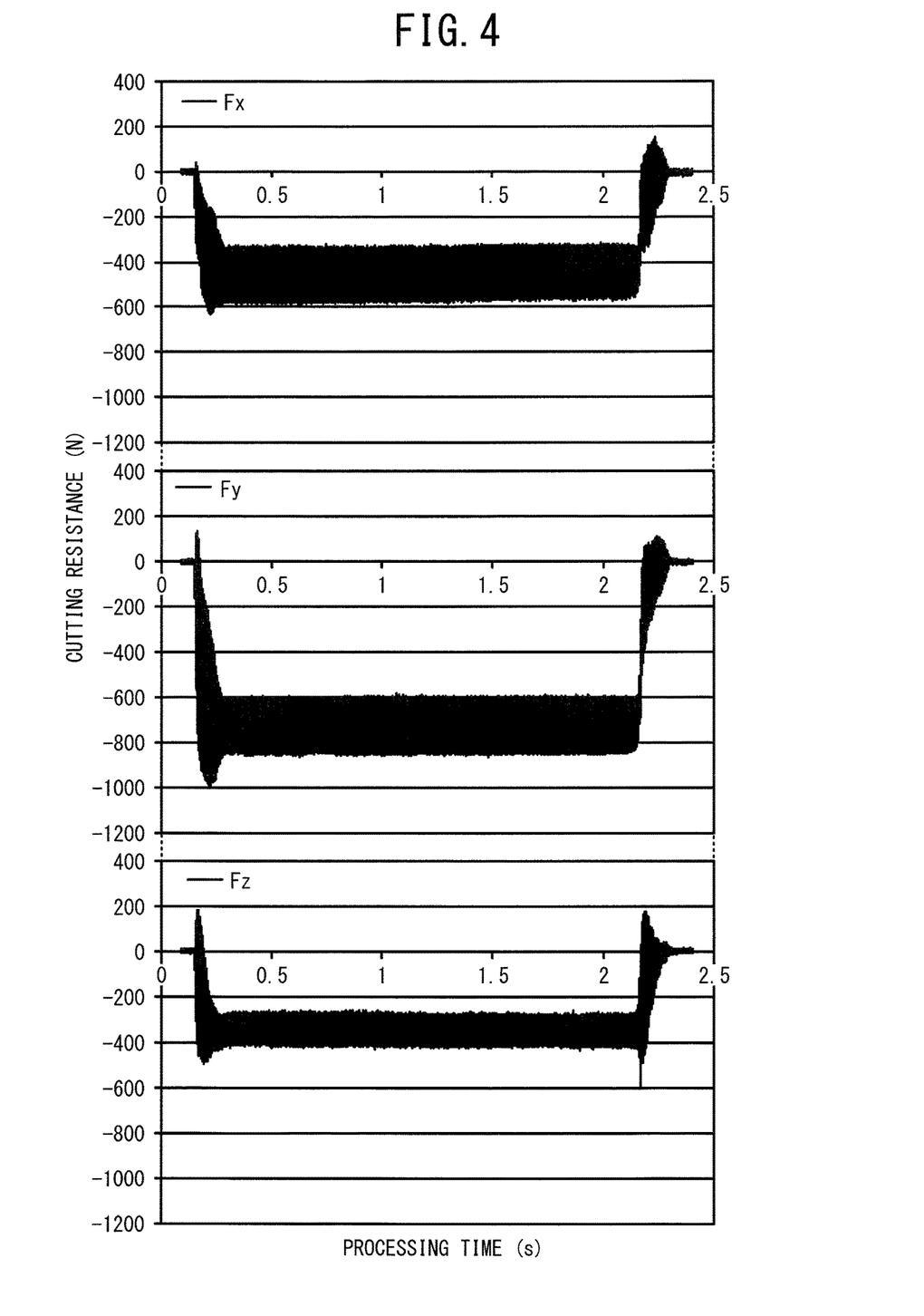
FIG. 4 is a graph that shows evaluation results for a working example.
Figure 5:
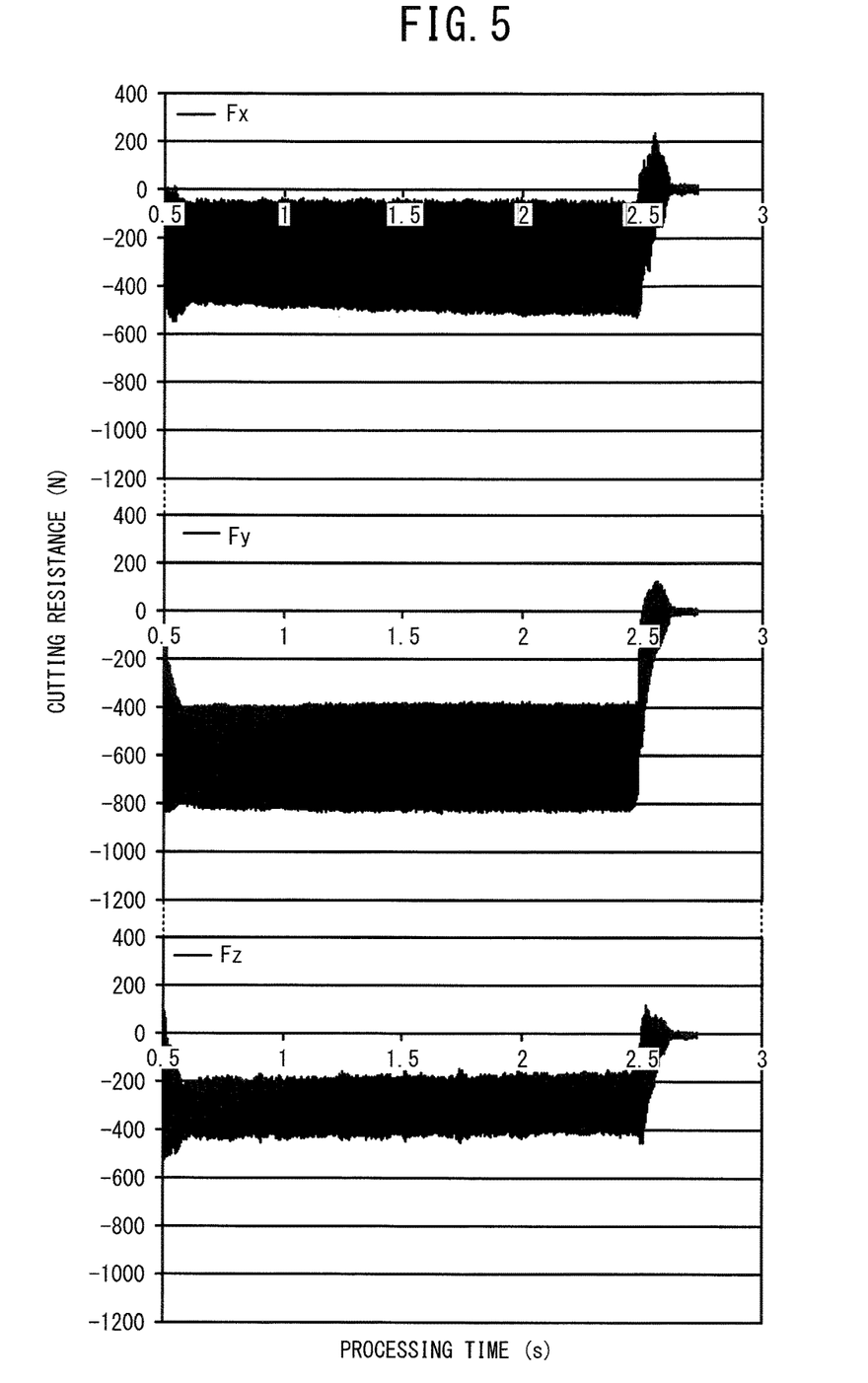
FIG. 5 is a graph that shows evaluation results for a comparison example.

Side face cutting work was performed on the work material using the respective cutting tools of the working example and the comparative example, and the cutting resistance that acted on the cutting tools was measured. The test results for the working example are shown in FIG. 4, and the test results for the comparative example are shown in FIG. 5. In FIGS. 4 and 5, the vertical axis is the cutting resistance (N), and the horizontal axis is the processing time (s). The graphs in FIGS. 4 and 5 show the test results for Fx, Fy, and Fz in order from top to bottom. Fx is the vertical force component (main force component) that acts in a direction that is perpendicular to the feed force component. Fy is the horizontal force component (feed force component) that acts in the direction that the cutting tool is fed. Fz is the axial force component (thrust force component) that acts in the axial direction of the cutting tool. The main force component, the feed force component, and the thrust force component are force components in the x axis, y axis, and z axis directions, which are orthogonal to the cutting resistance.

As shown in FIGS. 4 and 5, the mean value of the main force component Fx is −279 N for the comparative example, as opposed to −437 N for the working example. The mean value of the feed force component Fy is −661 N for the comparative example, as opposed to −718 N for the working example. The mean value of the thrust force component Fz is −291 N for the comparative example, as opposed to −355 N for the working example.

On the other hand, the mean value of the amplitude of the main force component Fx is 502 N (that is, Fx=−279±251 N) for the comparative example, as opposed to 278 N (that is, Fx=−437±139 N) for the working example. The mean value of the amplitude of the feed force component Fy is 422 N (that is, Fy=−661±211 N) for the comparative example, as opposed to 274 N (that is, Fy=−718±137 N) for the working example. The mean value of the amplitude of the thrust force component Fz is 271 N (that is, Fz=−291±135 N) for the comparative example, as opposed to 178 N (that is, Fz=−355±89 N) for the working example.

A comparison of the mean values for the cutting resistance (N) for the working example and the comparative example shows that the mean values for the feed force component Fy and the thrust force component Fz are substantially equal numerical values. The mean value of the main force component Fx for the working example is 158 N less than the mean value of the main force component Fx for the comparative example. A comparison of the mean values for the amplitude of the cutting resistance (N) for the working example and the comparative example shows that the mean value of the amplitude of the main force component Fx for the working example is 224 N less than the mean value of the amplitude of the main force component Fx for the comparative example, or approximately 55% of the mean value of the amplitude of the main force component Fx for the comparative example. The mean value of the amplitude of the feed force component Fy for the working example is 148 N less than the mean value of the amplitude of the feed force component Fy for the comparative example, or approximately 65% of the mean value of the amplitude of the feed force component Fy for the comparative example. The mean value of the amplitude of the thrust force component Fz for the working example is 93 N less than the mean value of the amplitude of the thrust force component Fz for the comparative example, or approximately 66% of the mean value of the amplitude of the thrust force component Fz for the comparative example.

The results described above confirm that the cutting tool 1 of the working example exhibits less vibration during cutting (lower amplitude in the cutting resistance) than does the cutting tool of the comparative example. Based on these results, it is thought that in the working example, the cutting head 2 can be fastened to the main body 3 more precisely than in the comparative example, and that this is because the first female thread portion 34 that is made from the second metal material inhibits resonance. That is, it has been confirmed that providing the female thread portions 33 with the first female thread portions 34 that are made of the second metal material and the second female thread portions 35 that are made of the first metal material, as in the cutting tool 1 of the working example, inhibits the vibration that occurs during cutting work more effectively than does the comparative example, in which the female thread portions are made only of a single material.

In the embodiment that is described above, the cutting tool 1, the cutting head 2, and the main body 3 are respectively examples of a replaceable-tip cutting tool, a cutting head, and a replaceable-tip cutting tool main body of the present invention. The first female thread portions 34, the second female thread portions 35, and the female thread portions 33 are respectively examples of a first female thread portion, a second female thread portion, and a female thread portion of the present invention. The female thread root 36 and the female thread crest 37 are respectively examples of a female thread root and a female thread crest of the present invention. The front end portion 31 and the cylindrical portion 32 are respectively examples of a front end portion and a cylindrical portion of the present invention. The tapered portion 23 and the male threaded portion 24 are respectively examples of a tapered portion and a male threaded portion of the present invention.

In the replaceable-tip cutting tool main body in the above-mentioned embodiments, the male threaded portion 24 of the cutting head 2 is screwed together with the female thread portion 33, which includes the first female thread portion 34 and the second female thread portion 35. The use of a metal material with comparatively low rigidity for the first female thread portion 34 and a metal material with comparatively high rigidity for the second female thread portion 35 and the cylindrical portion 32 makes it possible both to maintain the rigidity of the main body 3 and to reduce the possibility of damage of the thread crests of the male threaded portion 24 or the female thread portion 33 due to the shock of vibration, the male threaded portion 24 and the female thread portion 33 join the main body 3 and the cutting head 2.

In the main body 3 of the cutting tool 1, the first metal material is an alloy with a density of not less than 10 grams per cubic centimeter, and the second metal material may is the type of steel. In the main body 3 of the cutting tool 1, the rigidity of the cylindrical portion 32 can be ensured by making the cylindrical portion 32 from the first metal material, which has the density of not less than 10 grams per cubic centimeter. Furthermore, making the first female thread portion 34 from a type of steel makes it possible to reduce the possibility of damage of thread crests of the male threaded portion 24 or the female thread portion 33 due to the shock of vibration, the male threaded portion 24 and the female thread portion 33 join the main body 3 and the cutting head 2.

In the main body 3 of the cutting tool 1, the thickness T1 of the cylindrical portion 32 in the radial direction is greater than the thickness T2 of the female thread portion 33 in the radial direction. Therefore, in the main body 3 of the cutting tool 1, the rigidity of the cylindrical portion can be ensured, because the thickness T1 of the cylindrical portion 32 in the radial direction is greater than the thickness T2 of the female thread portion 33 in the radial direction.

The main body 3 of the cutting tool 1 includes a cylinder-shaped front end portion on a front end of the cylindrical portion 32 and the female thread portion 33. The cylinder-shaped front end portion is made from the second metal material and accommodates the tapered portion 23 that is continuous with the male threaded portion 24 of the cutting head 2. The tapered portion 23 has a smaller diameter on the male threaded portion 24 side. Therefore, in the main body 3 of the cutting tool 1, the tapered portion 23, which is continuous with the male threaded portion 24 of the cutting head 2, can be accommodated by the front end portion, which is made of the second metal material. Therefore, the main body 3 of the cutting tool 1 is better able to reduce the possibility of damage of the thread crests of the male threaded portion 24 or the female thread portion 33 due to the shock of vibration, the male threaded portion 24 and the female thread portion 33 join the main body 3 and the cutting head 2, than would be the case if the front end portion 31 were not provided.

The cutting tool 1 includes the main body 3 and the cutting head 2 having the male threaded portion 24 that, when screwed together with the female thread portion 33 of the main body 3, comes into contact with both the first female thread portion 34 and the second female thread portion 35. In the cutting tool 1, the male threaded portion 24 of the cutting head 2 comes into contact with both the first female thread portion 34 and the second female thread portion 35. Therefore, in the cutting tool 1, the second female thread portion 35 makes it possible for the cutting head to be fastened tightly to the main body, even as the first female thread portion 34 makes it possible to reduce the shock of vibration of the thread crests of the male threaded portion 24 or the female thread portion 33, the male threaded portion 24 and the female thread portion 33 join the main body 3 and the cutting head 2.

The replaceable-tip cutting tool and the main body of the present invention are not limited to those described in the embodiment that is described above, and various types of modifications can be made within the scope of the present invention. For example, the modifications hereinafter described may be made.

The numerical values that are mentioned in the embodiment that is described above are merely examples, and other numerical values may also be used. A cutting tool such as an end mill, a drill, a tap, and the like may also be used for the cutting tool. The types of the male threads and the female threads are not specifically limited to metric threads, unified threads, buttress threads, or the like. The male threads may be threaded in accordance with the cutting direction of the cutting head (the direction in which the threads tighten in relation to the cutting resistance of the cutting head). At least one of the front end portion 31 and the bottom portion 39 of the main body 3 may also be made of the first metal material. The second metal material needs only to be different from the first metal material. Specifically, it is acceptable for the first metal material not to be an alloy with a density of not less than 10 grams per cubic centimeter. It is also acceptable for the second metal material not to be a type of steel. It is also acceptable for the thickness of the cylindrical portion in the radial direction not to be greater than the thickness of the female thread portion in the radial direction. In a case where the male threaded portion of the cutting head is threaded into the female thread portions of the main body, it is acceptable for the male threaded portion to come into contact only with the first female thread portions.

The invention claimed is:

1. A replaceable-tip cutting tool main body, comprising:
   a cylinder-shaped cylindrical portion made from a first metal material and extending in an axial direction, the first metal material being an alloy with a density of not less than 10 grams per cubic centimeter; and
   a female thread portion provided on an inner circumference of the cylindrical portion and capable of being screwed together with a male threaded portion of a cutting head, the female thread portion including:
      a first female thread portion made from a second metal material that is different from the first metal material, and the first female thread portion being a portion extending between a top of a female thread crest of the female thread portion and a portion corresponding to an effective diameter of the female thread portion in a radial direction that is perpendicular to the axial direction, the second metal material being a type of steel; and
      a second female thread portion being made from the first metal material, continuous with the inner circumference of the cylindrical portion, the second female thread portion being a remaining portion of the female thread portion excluding the first female thread portion.

2. The replaceable-tip cutting tool main body according to claim 1, wherein
   a thickness of the cylindrical portion in the radial direction is greater than a thickness of the female thread portion in the radial direction.

3. The replaceable-tip cutting tool main body according to claim 1, further comprising:
   a cylinder-shaped front end portion on a front end of the cylindrical portion and the female thread portion, made from the second metal material and accommodating a tapered portion that is continuous with the male threaded portion of the cutting head, and the tapered portion having a smaller diameter on a side of the male threaded portion in the axial direction.

4. A replaceable-tip cutting tool, comprising:
   the replaceable-tip cutting tool main body according to claim 1; and
   the cutting head having the male threaded portion that, when screwed together with the female thread portion of the main body, comes into contact with both the first female thread portion and the second female thread portion.

* * * * *